United States Patent [19]
Amend et al.

[11] 3,839,804
[45] Oct. 8, 1974

[54] ENERGY-ENVIRONMENT SIMULATOR

[75] Inventors: John R. Amend, Bozeman, Mont.; John F. Yegge, Oak Ridge, Tenn.

[73] Assignee: The United States of America as represented by the United States Atomic Energy Commission, Washington, D.C.

[22] Filed: Nov. 8, 1973

[21] Appl. No.: 414,026

[52] U.S. Cl.................... 35/10, 35/24 C, 235/184, 273/1 E
[51] Int. Cl. ............................................. G09b 9/00
[58] Field of Search.............. 35/24 R, 24 C, 10, 13; 235/184, 185; 273/1 R, 1 E

[56] References Cited
UNITED STATES PATENTS

| | | | |
|---|---|---|---|
| 2,712,184 | 7/1955 | Ziebolz et al. ........................... | 35/10 |
| 3,001,714 | 9/1961 | McKinley et al. ................... | 235/184 |
| 3,027,083 | 3/1962 | Heigl et al. .......................... | 235/184 |
| 3,044,704 | 7/1962 | Anke et al. ........................... | 235/184 |
| 3,406,281 | 10/1968 | Buchanan et al. .............. | 235/184 X |
| 3,491,194 | 1/1970 | Smith................................. | 35/24 C |

*Primary Examiner*—Wm. H. Grieb
*Attorney, Agent, or Firm*—John A. Horan; David S. Zachry; David E. Breeden

[57] ABSTRACT

An energy-environment simulator has been provided which may be adapted to be used by one or more participants, each operating one or more control panels to select the energy demand for industry, transportation, and household and commercial, respectively. Each participant makes policy decisions to adjust energy demands and energy source allocations and observes, in compressed time, the consequences of their decisions. The time element is adjustable by means of a variable system clock, typically one simulated century passes each minute. The natural energy reserves are simulated in an analog computer circuit and the rate of depletion may be regulated according to well-established data as to quantities and the forecasted rate of depletion. The simulated energy reserve values are selectively fed to one of two energy pools: the chemical energy pool and the electrical energy pool and these pools in turn compare the set demands by means of analog computer circuits with reserve supplies. The participants operate the simulator as a game where the objective is to see how long one can keep the society powered adequately without excessively polluting the environment and without exhausting all of the energy reserves. Analog circuits are provided to indicate to participants when demands are too great for the supply and when energy production is distributed so as to exceed preset acceptable pollution levels.

10 Claims, 6 Drawing Figures

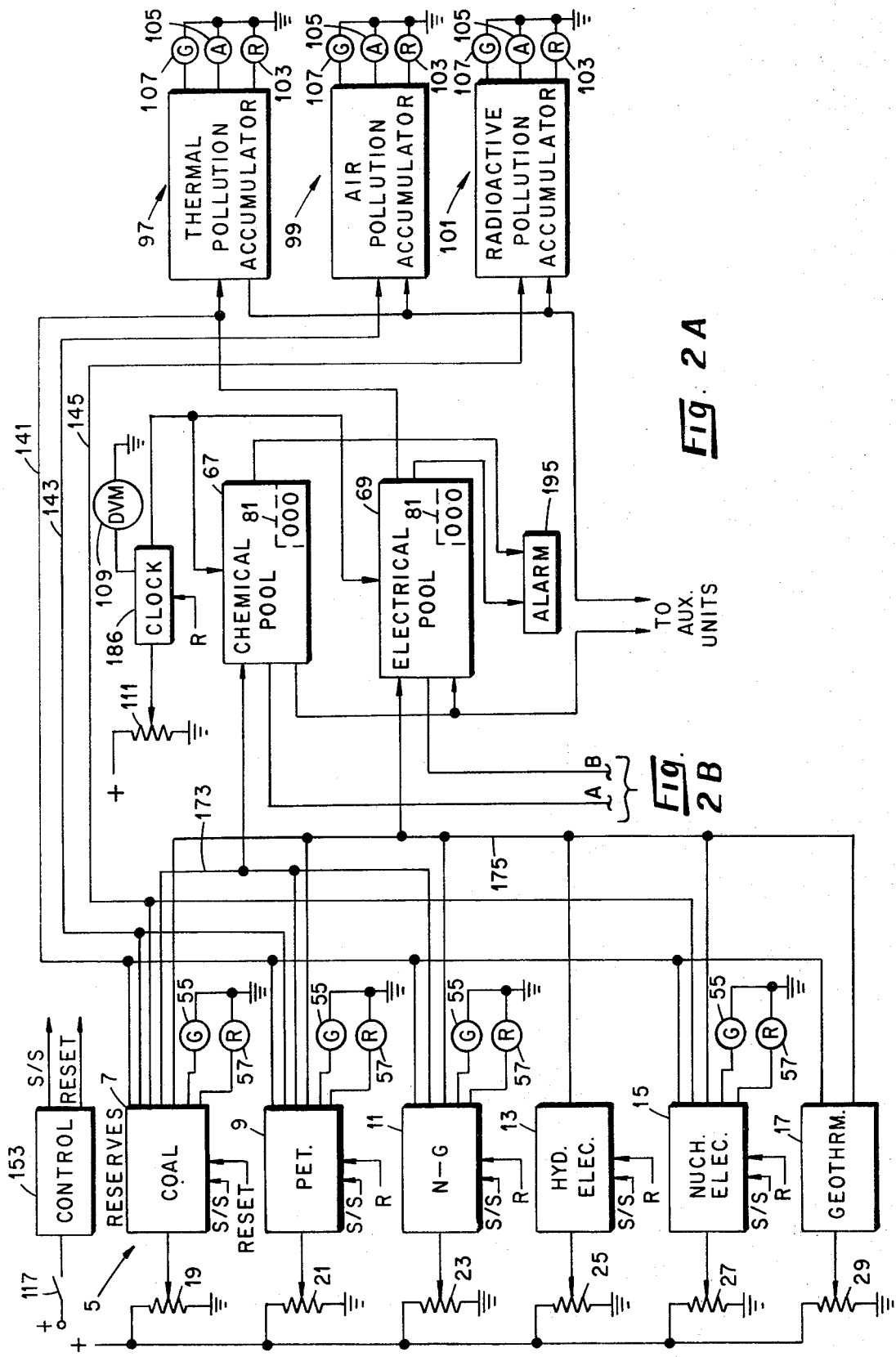

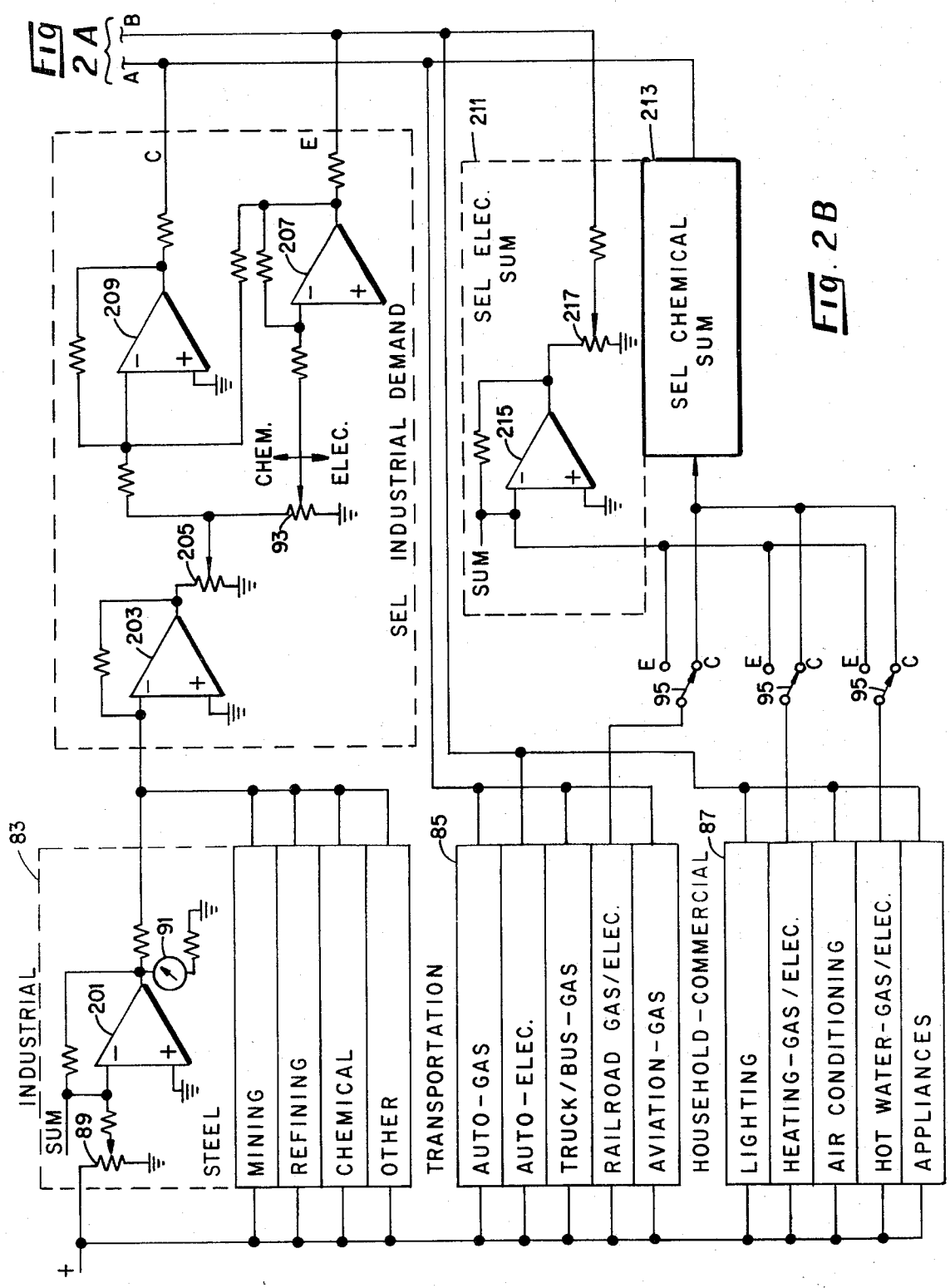

ENERGY-ENVIRONMENT SIMULATOR

BACKGROUND OF THE INVENTION

The present invention relates to electronic simulators and more specifically to an analog computer simulator of an energy-environment situation in which one or more participants may collectively manipulate and observe, in compressed time, the complex interrelationships among the growing demand for energy, the rapidly dwindling energy reserves; and the contamination of the environment caused by the production and use of energy.

The present invention was made during the course of, or under, a contract with the United States Atomic Energy Commission.

In view of the ever increasing problem of increasing demand for energy, the associated depletion of natural energy reserves and the environmental pollution problems aggravated by the increase in energy production and consumption, it is apparent that there is a need for some means of apprising the public of the complexities and ultimate necessity of conserving energy in a manner which is informative, challenging and relatively simple to comprehend.

SUMMARY OF THE INVENTION

In view of the above, it is an object of this invention to provide an energy-environment simulator which may be adapted to be used by one or more participants to see how long participants can keep the simulated society powered adequately without excessively polluting the environment and without exhausting energy reserve.

Another object of this invention is to provide a realistic computerized energy-environmental simulator characterized by a plurality of differing natural energy reserve simulators, each including means for presetting the total reserve available and means for regulating the rate of depletion of each reserve, respectively; a plurality of differing energy demand simulators each including means for regulating the rate of consumption of energy supplied by said plurality of natural energy reserves; and a variable time lapse clock source for simulating accelerated time periods and having connections to each of said pluralities of simulators for controlling the rates of depletion of said reserve simulators and said rates of consumption of said demand simulators according to the selected accelerated time period.

The invention accordingly comprises the computerized energy-environmental simulator possessing the construction and combination of elements, and arrangements of parts that are exemplified in the following detailed description taken in conjunction with the drawings, the scope of which will be indicated in the claims attached to and forming a part of this application.

BRIEF DESCRIPTION OF THE DRAWINGS

FIGS. 2A and 2B are block diagrams with partial schematics of analog computer circuits of the energy-environment simulator in which like reference numerals indicate like control apparatus shown on the control panel in FIG. 1.

DESCRIPTION OF THE PREFERRED EMBODIMENT

Figure 1:
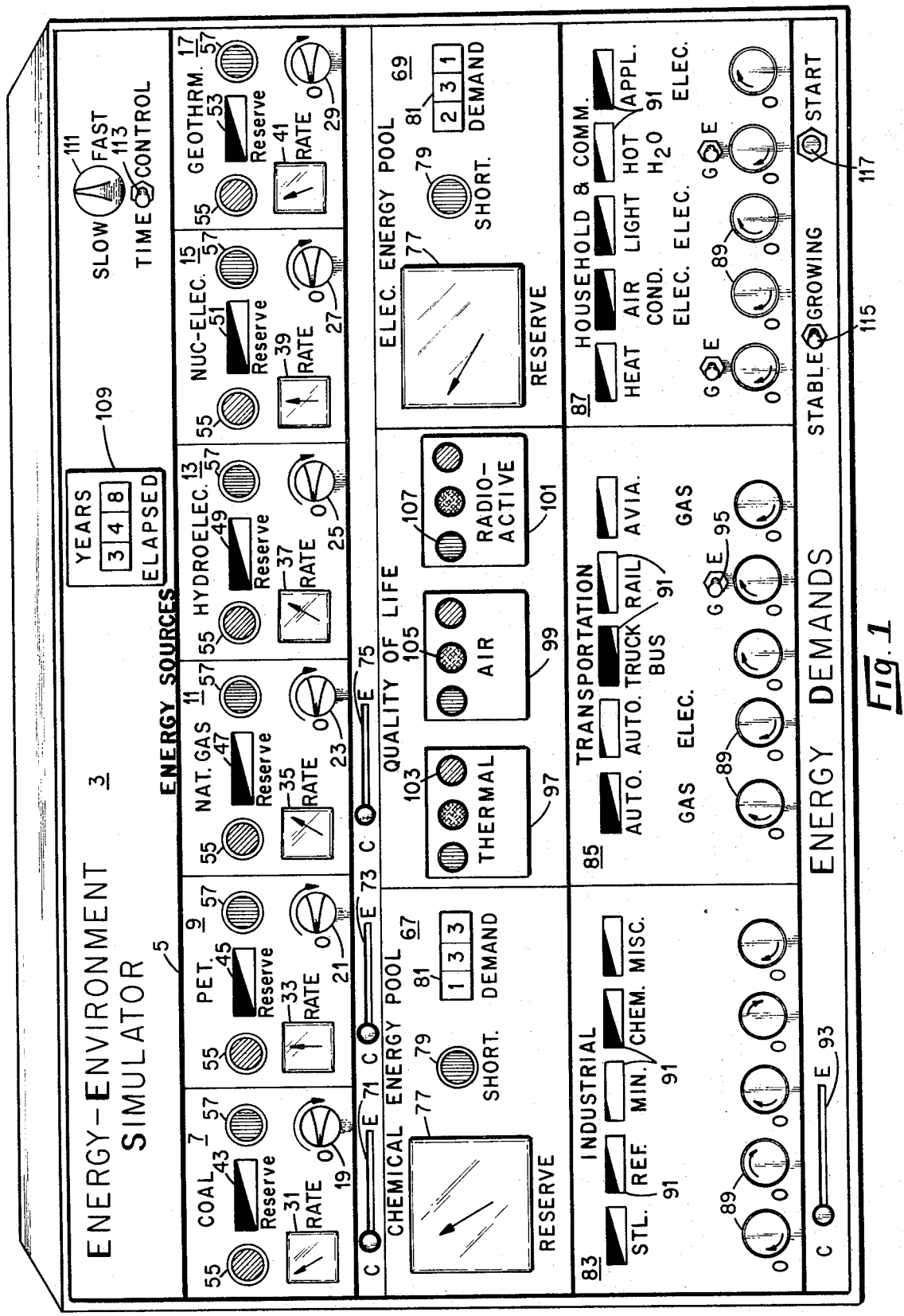
FIG. 1 is a pictorial view of an energy-environment simulator control panel according to the present invention.

Referring now to FIG. 1, the simulator control panel 3 is shown to be divided into four major regions. An energy reserve region 5 across the top of the panel is a row of energy source boxes representing coal reserves 7, petroleum reserves 9, natural gas reserves 11, hydroelectric reserves 13, nuclear electric reserves 15, and geothermal reserves 17. The rate of depletion of each of the six energy reserves is regulated by setting corresponding knobs 19 through 29. Meters 31 through 41 located near each of the knobs display how fast the corresponding reserve is being used. Meters 43 through 53 located in the corresponding reserve sections indicate how much of the reserve remains available for use. To complete the reserve sections, each is provided with a pair of indicator lamps 55 and 57 which may be green and red lamps, as indicated by the shading, to indicate the depletion of a particular reserve. The device may be wired, as will be explained later, so that the green lamp in "On" as long as there is a sufficient reserve and when the reserve is depleted the red lamp will be lit to warn the participants to adjust demands and/or substitute optional reserves to compensate for the particular reserve depletion.

The energy reserves are combined to selectively feed a chemical energy pool 67 and an electrical energy pool 69, the two energy pools forming the second region of the panel. The coal 7, petroleum 9, and natural gas 11 reserves may be selectively proportioned to feed either of the energy pools by means of slide selector switches 71, 73 and 75, respectively, mounted beneath the reserve section on the panel, as will be described in more detail hereinbelow. The remaining reserves are fed directly to the electrical energy pool since these are, for the most part, converted to electrical energy. The two energy pools compare the reserves with demands from the demand region, as will be explained below. Each of the energy pools has meters 77 labeled "energy reserve" which indicate to the participants how well the supply is meeting the demand. In addition to the meters 77, there may be a red indicator light 79 which is activated when there is an energy shortage in either of the energy pools. Further, each of the energy pool regions is provided with an energy demand meter 81 which is preferably a digital volt meter calibrated to read in arbitrary relative demand units, and which can be easily viewed by participants to constantly indicate the demand on each of the pools.

The third region on the panel is the energy demand which consists of three energy demand boxes in a row across the bottom of the panel representing industrial demand 83, transportation demand 85, and household and commercial demand 87. Each box has a plurality of demand selector knobs 89 and a corresponding demand meter 91 which indicates the demand selected by means of selectors 89. The industrial demand section is provided with selector knobs 89 for steel production, refining, mining, chemical production, and other industrial demands combined in one selector. A further selector, in the form of a slide adjustment lever 93, is provided with which the participant may select the proportion of chemical and electrical energy to supply the industrial demand. When the selector is positioned to the extreme left, the demand is supplied completely from the chemical energy reserves; and when positioned to the extreme right the demand is supplied completely from the electrical energy reserves.

The transportation demand section is provided with selector knobs 89 for automobile-gas, automobile-electric, trucks and buses, railroads, and aviation. The railroad demand has an additional selection option for operating the railroads on either gas or electricity by means of a selector switch 95.

The household and commercial demands are combined and selector knobs 89 and corresponding meters 91 are provided for heating, air conditioning, lighting, hot water, and appliances. The heating and hot water sections are also provided with a selector switch 95 for selecting either gas or electricity to fill these demands.

The fourth region on the panel indicates the quality of life affected by the production and use of energy. This region is divided into three indicator sections: thermal pollution 97, air pollution 99, and radioactive pollution 101. Each indicator section includes three indicator lamps 103, 105, and 107 which may be red, amber, and green lamps, respectively, to indicate the amount of each kind of pollution. The environment is considered safe as long as the green lamp 107 is "On" in each section. The amber lamp 105 "On" indicates that the environment is deteriorating, and the red lamp 103 "On" indicates that the quality of life is seriously impaired and that immediate action should be taken, i.e., reduce energy production and/or consumption.

To complete the game panel, there is provided a clock display in the form of a digital voltmeter 109 which indicates years elapsed in the compressed time scale of operation and a time scale selector knob 111 positioned adjacent the meter 109. Beneath the selector knob 111 is a selector switch 113 for optional control of the rate at which the demands grow as time elapses.

At the bottom of the panel is a selector switch 115 which further controls the rate of growth of the demand region with respect to elapsed time which provides the option of a stable or growing demand. The game may be played either with a stable demand over time, or with one of two continuously growing demands selected by switch 113. In the latter case the demand may grow linearly or exponentially as the demand has grown historically over the last century. Participants have the option of changing the mode of growth as the game progresses.

Once all of the preliminary selections have been made, the game is started by pressing the start button 117 located in the lower right corner of the panel. The operation of the game and some of the participant judgments necessary to keep the society adequately powered while conserving the natural energy reserves will be pointed out hereinbelow following a detailed description of the configuration and function of the analog computer circuits devised to carry out the desired functions generally set forth above in the brief description of the simulator control panel.

Referring now to FIGS. 2A and 2B, there is shown in block form the analog computer circuitry for the simulator region with like reference numerals as depicted in FIG. 1. In FIG. 2A there is shown the energy reserve region 5, the chemical energy pool 67, electrical energy pool 69, and quality of life region including the thermal 97, air 99, and radioactive 101 pollution sections.

Beginning with the reserves region 5 there is shown the coal 7, petroleum 9, natural gas 11, hydroelectric 13, nuclear electric 15 and geothermal 17 reserves with control potentiometers 19 through 29 corresponding to like numbered control knobs on the simulator panel 3.

Each of the reserve sections is similar in function with certain portions of the circuit not connected as will be explained. For example, the coal reserve section 7, being the most illustrative, is shown in schematic diagram form in FIG. 3. The potentiometer 19 is connected with the adjustable arm thereof resistively connected to one contact of a set of normally closed relay contacts 171-A, having the normally open contact connected to ground through a load resistor 121 so that the common contact is connected to the inverting (−) input of an operational amplifier 123. The output of amplifier 123 is connected through a calibration potentiometer 125 to the reserve rate meter 31 mounted on panel 3, FIG. 1. The output of amplifier 123 is also connected to another calibration potentiometer 127 which has its adjustable arm connected to the (−) input of an operational amplifier 129 whose output presents the selected amount of coal reserve allocated to the chemical energy pool 67. The adjustable arm of potentiometer 127 is also connected through selector 71, in the form of a potentiometer, to the (−) input of another operational amplifier 131 whose output represents the amount of coal reserve fed to the electrical energy pool. The output of amplifier 131 is connected through a resistor 133 to the (−) input of amplifier 129 so that by moving the selector 71 lever on the panel 3 the coal reserve may be selectively proportioned between the chemical and electrical energy pools 67 and 69, respectively, through connection from the outputs of amplifiers 129 and 131. Since the voltage at the output of amplifier 123 represents the rate of consumption of the coal reserve as set by control knob 19 and indicated on meter 31, it is proportioned to the energy pools by means of the selector 71 so that as the selector is moved toward electrical (E) the output of amplifier 131 becomes more positive which in turn reduces the positive voltage level at the output of amplifier 129 by the feedback through resistor 133 to reduce the negative voltage level at the inverting (−) input of amplifier 129.

Since the production of energy from coal produces thermal, air, and radioactive pollution, three output voltages according to the known pollution levels are provided at the indicated outputs from calibrating potentiometers 135, 137, and 139, respectively, which have their adjustable arms resistively connected to the thermal, air, and radioactive accumulator supply lines 141, 143, and 145, shown in FIG. 2A.

The remainder of the typical reserve circuit includes an integrator circuit 147 connected to the adjustable arm of potentiometer 127 through a switch 149 and a calibration potentiometer 151. Switch 149 may be a set of normally open contacts operated from the control unit 153 as indicated by the start/stop (S/S) output in FIG. 2A. The control unit 153 also provides a reset for the integrator 147 by shorting switch 155 across the integrator 147 which may be a set of momentary contacts operated from the control unit 153 when the start switch 117 is activated.

The output of integrator 147 is connected through a resistor to the coal reserve meter 43 which is located on panel 3. The initial coal reserve is preset by means of potentiometer 151 and as the game progresses the output of integrator 147 increases at a rate according to the consumption rate voltage from the output of amplifier 123. The output of the integrator 147 is also connected to the (−) input of an operational amplifier 157 which is connected as an inverting differential amplifier with an adjustable reference voltage source 159 connected to the noninverting (+) input thereof. The reference voltage selects the point at which the reserve is sufficiently depleted to indicate a shortage, resulting in reversal of the polarity of the output of amplifier 157, thereby deactivating a normally energized relay 161 connected to the output thereof through a diode 163 having its anode connected to the output of amplifier 157. Relay 161 has a set of contacts 161-A which controls the lamps 55 and 57, mounted on panel 3, so that the green (G) lamp is "On" when relay 161 is activated; and the red (R) lamp is "On" when the relay 161 is deactivated.

The output of amplifier 157 is also connected to the (−) input of an operational amplifier 165 which has a variable reference voltage source 167 connected to the (+) input thereof. Amplifier 165 is also connected as a differential amplifier and the reference voltage is set so that when the output of amplifier 157 goes sufficiently positive to indicate the depletion of the reserve, a diode 169 connected with the anode to the output of amplifier 165 conducts, activating a relay 171 connected between the cathode of diode 169 and ground potential. The purpose of relay 171 is to switch "Off" the energy source drive to the energy pool from that resource when expended by opening contacts 171-A to disconnect the source voltage.

Referring again to FIG. 2A, it will be understood that each of the reserve sections, although not completely identical, functions similarly to the coal reserve section 7. Each of the reserves use depletion rate is controlled by positioning potentiometers 19 through 29 by means of the corresponding numbered knobs on panel 3 which applies a voltage simulating the use rate which is registered by the corresponding meters 31 through 41 on panel 3. The hydroelectric 13 and geothermal 17 sections may not require the start/stop and reset functions from the control unit 153 since the reserve amount indicator lights are not normally connected in these sections because these reserves are considered inexhaustible. Therefore, these functions are not shown in FIG. 2A.

Since production of energy from the various energy reserves produces different pollutants, various connections and corresponding calibration potentiometers are provided that are connected as described with reference to FIG. 3 above. Accordingly, the thermal pollution bus 141 is connected to outputs of the coal 7, petroleum 9, natural gas 11, nuclear electric 15, and geothermal 17 reserve sections. The air pollution, primarily suspended particulate, bus 143 is connected to the coal 7 and petroleum 9 reserve sections, while the radioactive pollution bus 145 is connected to outputs of the coal 7 and nuclear electric 15 reserve sections.

As shown in FIG. 2A, the reserves are fed into either the chemical energy pool 67 or the electrical energy pool 69. The petroleum 9 and natural-gas 11 reserve simulators are identical to the coal 7 reserve sections illustrated in FIG. 3 in that the selection may be made to proportion the individual reserves to either the chemical 67 or electrical 69 pools. Therefore, these three units have outputs connected to a chemical pool supply bus 173 and an electrical pool supply bus 175. The hydroelectric 13, nuclear electric 15 and geothermal 17 reserve outputs are connected to the electrical pool bus 175.

Figure 4:
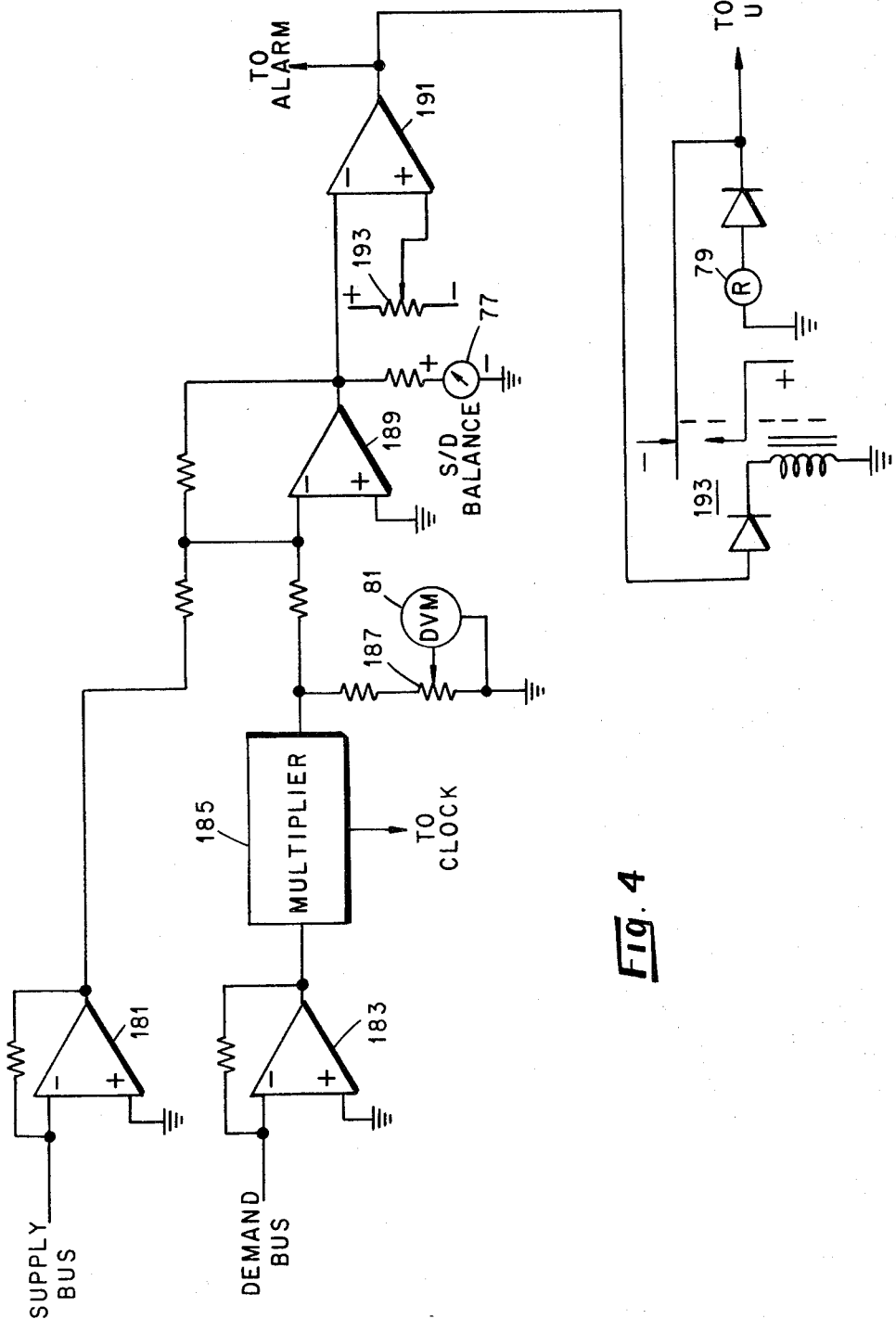
FIG. 4 is a schematic diagram of a typical energy pool shown in block form in FIG. 2A.

A typical energy pool simulator circuit is shown in FIG. 4. The reserve supply bus is connected to the inverting input (−) of an operational amplifier 181 while the corresponding energy demand bus from the demand region is connected to the (−) input of an operational amplifier 183. The output of amplifier 183 is connected to one input of a multiplier 185 which multiplies the demand analog signal by an analog clock signal from the system clock 186 (FIG. 2A). The analog clock signal is an increasing amplitude signal, as will be explained hereinbelow, which increases at a rate according to the compressed selected time factor as set by potentiometer 111, corresponding to the selector knob 111 on panel 3. The output signal from multiplier 185 is a voltage representing the demand in the compressed time frame and is displayed on the digital voltmeter 81 connected by means of a calibration circuit 187 to the output of multiplier 185. This increasing demand may be compared with the reserve supply by connecting the outputs of multiplier 185 and amplifier 181 to the summing input of an amplifier 189. The output of amplifier 189 is a signal indicative of the supply/demand balance which is read by meter 77. This output is connected to the input of an operational amplifier connected as a comparator amplifier 191 with a variable reference voltage supply 193 connected to the (+) input. The reference voltage may be set to sound an alarm 195 (FIG. 2A) when the demand exceeds the reserve supply rate. The alarm 195 may be of various forms, such as a light or a buzzer, which indicates when the polarity of the signal at the output of amplifier 191 changes. As shown in FIG. 4, additional indication circuitry is provided in the form of a relay circuit 193 which is normally activated by the positive signal output of amplifier 191 and when the polarity changes, indicating a shortage, the relay is deactivated, thereby causing the shortage indicator lamp 79 to be turned "On."

As shown in FIG. 2A, the energy pools 67 and 69 receive the energy demand signals on lines A and B, respectively, from the energy demand simulator region shown in FIG. 2B. As described above, the demand region is divided into three demand sections: industrial 83, transportation 85, and household and commercial 87. Each of the consuming entities as indicated within the section blocks is simulated as illustrated in detail for the steel manufacturing of the industrial 83 section. Each has a demand selection potentiometer 89 whose adjustment knob is mounted on panel 3 and a corresponding demand meter 91. The participants select the demand by setting potentiometer 89 at a desired position which applies a voltage to a summing amplifier 201. The output of amplifier 201 is connected to the demand meter 91 which is also mounted on panel 3.

Since it is well known that industrial demands are divided between electrical energy and chemical energy, the output of each of the industrial demands is commonly connected to the input of a summing amplifier 203. The output of amplifier 203 is connected through a calibration potentiometer 205 to the industrial demand selector in the form of a potentiometer 93 whose selector lever is located on panel 3. The adjustable arm of potentiometer 93 is connected to the input of an inverting amplifier 207 whose output represents the electrical energy demand for the industrial sections and thus is connected to the electrical demand bus B. To provide the proportionate chemical demand output, the output of amplifier 207 is resistively connected along with the output of amplifier 203 to the input of another inverting amplifier 209 whose output represents the industrial chemical energy demand and thus is connected to the chemical energy demand bus A. The selectable industrial demand circuit operates as follows: The output of amplifier 203 is a positive signal representing the total demand and is applied to potentiometer 93. By positioning the selector potentiometer 93 a portion of this signal is applied to inverting amplifier 207 whose output is a negative polarity signal representing the selected electrical portion. This electrical portion signal is subtracted from the total demand signal at the summing junction input of amplifier 209 so that the output signal of amplifier 209 then represents the chemical demand portion.

As shown in FIG. 2B, the remaining demand sections 85 and 87 are connected directly to either the chemical energy demand bus A or the electrical energy bus B according to the known nature of the demand, with the exception of the railroad, heating, and water heating demands. These latter mentioned demands are generally selectable by the consumer, and thus these outputs are connected to the selector arm of two-position selector switches 95 located on panel 3. This selectable output may be taken at the demand selection potentiometer 89 arm (not shown) for reasons which will be explained hereinbelow. Position E of switches 95 selects an electrical demand while the other position C selects a chemical demand. All of the E contacts of switches 95 are connected to the input of a selectable electric summing circuit 211 and the C contacts are connected to the input of a selectable chemical summing circuit 213. Each of the summing circuits is identical as illustrated in the schematic diagram of the electric summing circuit 211. The input line is connected to a summing amplifier 215 whose output is connected to the electrical demand bus B through a calibrating potentiometer 217. The output of circuit 213 is connected to the chemical energy demand bus A.

The demands on lines A and B are compared with the reserve supply, as described above, and as long as the total demand as registered by meters 81 in the energy pools 67 and 69 does not exceed the supply and the total volume does not cause excessive pollution the participants have made the correct decisions in the game.

As will be noted in FIG. 2A, the pollution levels on the buses 141, 143, and 145 are fed to corresponding thermal 97, air 99, and radioactive 101 pollution accumulators. It will be noted that since the production of electrical energy produces some thermal pollution, a calibrated output indicative of this factor is taken from the total demand section of the electrical pool 69 at the output of the multiplier (not shown). Each of the pollution accumulators consists of a summing amplifier and adjustable reference comparators for controlling the lamps 103, 105, and 107 which indicate the pollution levels, as described above.

Figure 5:
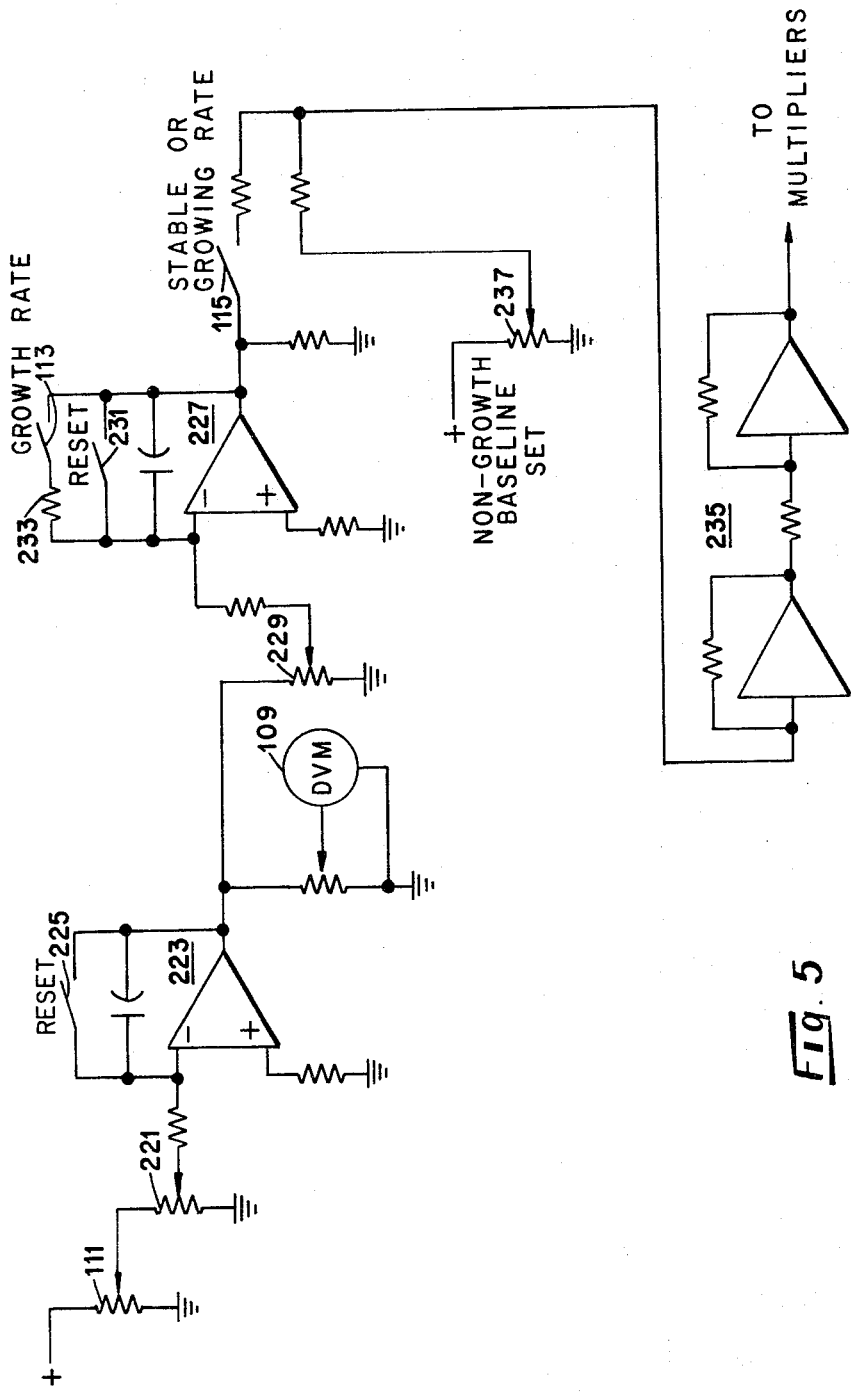
FIG. 5 is a schematic diagram of the clock shown in block form in FIG. 2A.

Referring now to FIG. 5, there is shown a typical clock circuit shown in block form in FIG. 2A. The time controller 111, knob mounted on panel 3, is a potentiometer with its adjustable arm connected through a calibrating potentiometer 221 to the input of an integrator circuit 223. The integrator circuit 223 has a reset switch 225, operated from the controller 153 at start, that sets the output of integrator 223 to zero and thus resets the digital voltmeter clock 109 connected to the output of integrator 223. The output of integrator 223 is also connected to the input of another integrator 227 through a calibrating potentiometer 229. Integrator 227 is similar to integrator 223, including a reset switch 231 also operated by the controller 153. An additional feature is provided to control the growth rate of the demand by means of a series resistor 233 and selector switch 113, mounted on panel 3, connected in the feedback circuit of integrator 227. When the switch is closed the growth rate is linear and when the switch is open the rate or voltage at the output of integrator 227 is exponential. The output of integrator 227 is connected through selector switch 115 to a driver circuit 235 whose output is fed to the multiplier 185 in the chemical and electrical energy pools 67 and 69. When switch 115 is open, stable position on panel 3, only the base line set voltage from an adjustable voltage source 237 is applied to the driver circuit 235. However, when switch 115 is in the growing position, switch closed, both the base line voltage and the selected increasing voltage from integrator 227 are applied to the driver circuit 235. Therefore, it will be understood that the game may be played by assuming a stable demand or with a continually growing energy demand. In the latter case the demand may grow linearly or exponentially, as the energy demand has grown historically over the last century. Participants have the option of changing the mode of growth as the game progresses.

In an alternate embodiment of the simulator, miniaturized auxiliary control panels (not shown), attached by electrical cables to the main console of control panel 3, may be provided for distribution into an audience so that participants may make adjustments separately which are averaged at various inputs to the master simulator console. Each auxiliary panel includes separately adjustable selector knobs for each of the six energy reserves and each of the fifteen energy demands. These settings are summed at various summing junctions in the main control console to provide a weighted average indicated on the various meters of panel 3. Each of the reserve sections 7 through 17 has a sum input, as shown in FIG. 3, at the input of amplifier 123 to which the corresponding outputs of the auxiliary panels are connected. Similarly, the demand outputs are connected to summing junctions, as illustrated in FIG. 2B, at the inputs of amplifiers 201 and 215. In addition, the auxiliary panels may be provided with indicator lights to indicate the condition of the reserve demand balance which are controlled from outputs of the corresponding energy pools, as indicated in FIGS. 2A and 4. A similar lamp control output may be provided from the pollution accumulator circuits 97, 99, and 101, as shown in FIG. 2A. The auxiliary panels typically have three indicator lamps (green, amber, and red) which indicate the total pollution level of the three separate pollution accumulators 97, 99, and 101.

In operation, the game may be played by one or more participants, as indicated above. The game is not necessarily a contest among participants as games usually are. Instead, the participants pit their judgment regarding the rate of use and allocation of the various available energy reserves in an effort to conserve the world's consumable energy sources as long as possible. Participants experience, in an accelerated time scale, the complex interrelationship among the twenty-one variables presented, observe the environmental effects, and almost continually be faced with the need to make and revise decisions in the light of changing conditions.

Initially, the simulator may be calibrated at the various points through the analog circuits, as pointed out above, to provide relative voltage values corresponding to known energy reserve and demand data as may be compiled from the September 1971 issue of *Scientific American*, which is devoted to world energy supplies. Since the intent of the device is to be an informative energy-environment simulator game, no attempt has been made to calibrate the circuits in particular energy units, and to play the game this is not necessary. The circuits are simply weighted according to known relative percentages of both energy reserves and demands. For example, each of the reserve sections, as illustrated in FIG. 3 for the coal reserve, may be calibrated by setting potentiometer 127 so that the coal reserve would be approximately 20 percent of the total energy reserve which is proportioned presently in the United States as follows:

| | |
|---|---|
| Coal | 20.1% |
| Petroleum | 39.6% |
| Natural Gas | 35.6% |
| Hydroelectric | 4.0% |
| Nuclear Power | 0.6% |
| Geothermal Power | <0.1% |

Figure 3:
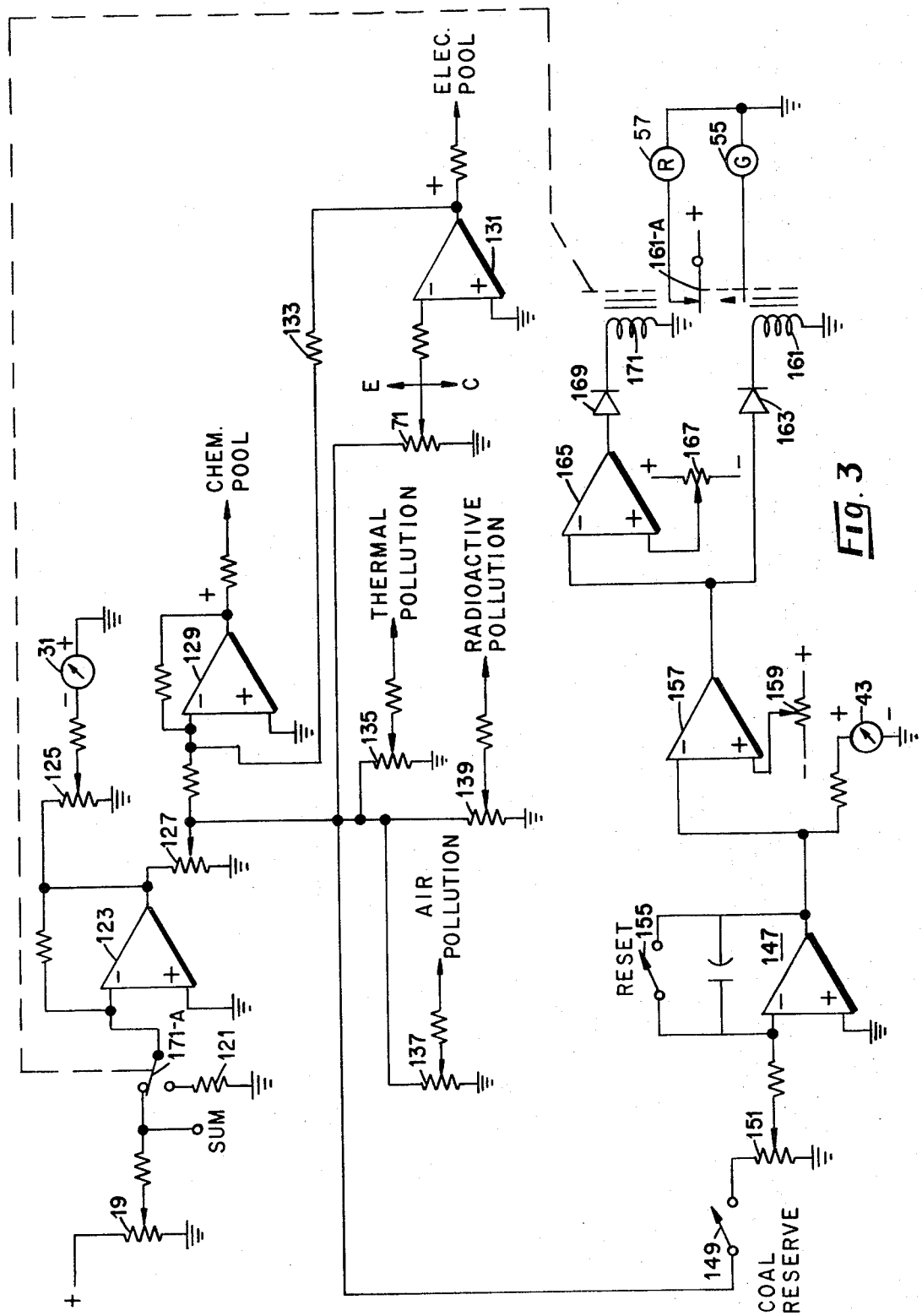
FIG. 3 is a schematic diagram of the coal reserve section shown in block form in FIG. 2A.

The rate at which the reserves are being used may also be weighted by relative settings of potentiometers 127 of the reserve sections, see illustration in FIG. 3.

The demand sections may be calibrated by adjusting potentiometer 205, as illustrated in FIG. 2B, so that the rates of consumption for each demand section are weighted as follows:

| | |
|---|---|
| Industry | 41.2% |
| Transportation | 25.2% |
| Residential | 19.2% |
| Commercial | 14.4% |

It will be understood that each of the specific demands in the demand sections 85 and 87 may have an amplifier 203 and calibration potentiometer 205 so that they may be separately calibrated as illustrated for the combined outputs of the industrial demand 83.

The pollution levels may be calibrated somewhat arbitrarily by setting potentiometers 135 through 139 as illustrated in FIG. 3. For example, in the case of production of energy from coal, air pollution would be approximately 10 times that of petroleum and natural gas is considered to produce no air pollution when used to produce energy. Thus, the various potentiometers for the remaining energy reserve sections are set in a similar manner with outputs to the pollution accumulators as illustrated in FIG. 2A.

Once the simulator has been calibrated, participants may select the rate of depletion of each of the energy reserves 7 through 17 by setting knobs 19 through 29, respectively, the corresponding value is registered on the rate meters 31 through 41. The initial reserve available is preset on reserve meters 43 through 53. At this point the green lamp 57 will be "On," indicating sufficient reserve. The participants may then select, by means of selectors 71, 73, or 75, the proportionate amount of the corresponding coal 7, petroleum 9, and natural gas 11 reserves that are to be fed to the chemical 67 and electrical 69 energy pools.

Once the above settings have been made the energy demands are set by means of knobs 89 across the bottom of panel 3, setting each one of the meters 91 to a selected value. The industrial demand is proportioned between chemical (C) and electrical (E) demand by adjusting the slide selector 93. The accelerated time frame is selected by means of control 111, the midway point setting as shown would typically be about one simulated century per minute.

The selected rate of growth of the energy demand is selected by setting switches 113 and 115. With switch 113 to the left, as shown, demand would be stable. With switch 115 to the right the demand will grow at a linear or exponential rate depending upon whether the switch 113 is to the left or right position. Once these settings have been made, the game is started by depressing the start button 117.

The participants observe the various meters on panel 3 and as long as the reserves are supplying the pools fast enough to meet the demand, all is well; but if demand exceeds supply, one of the red lamps 79 in either energy pool 67 or 69, or both, will be lighted and the alarm may sound. If this happens the players have a "brown-out" or "black-out" and must either increase energy production, reduce demand, or perhaps divert energy production from one energy pool to the other to extinguish the lamp.

The reserve meters 77 of both energy pools 67 and 69 provide a convenient way to know in a glance how well supply is meeting the demand. The reserve meters 77 may be provided with scales which have marked regions indicating "surplus" and "shortage." In a "brown-out" or "black-out" condition at least one of the meters will be reading a "shortage." The players should maintain a slight energy production reserve, that is, keep the meter reading just inside the surplus region.

Since it is well known that uncontrolled energy production poisons the environment, there are three simulated monitors 97, 99, and 101 for thermal, air, and radioactivity in air, respectively. The green 103, yellow 105, and red 107 lamps in each of the pollution monitors or accumlators display the amount, in terms of biological harmfulness, of each of the pollutants. The environment is considered safe if all of the green lamps 103 are "On." The yellow lamps 105 indicate that the environment is deteriorating, and red lamps 107 indicate that the quality of life is seriously impaired and that immediate action must be taken to reduce energy production and/or consumption.

The game continues with the primary object of keeping the simulated demands powered adequately without excessively polluting the environment and without exhausting all of the fuel reserves.

What is claimed is:

1. A computerized energy-environment simulator, comprising:
   a plurality of differing natural energy reserve simulators, each including means for indicating the energy reserve available and means for selecting the rate of depletion of the corresponding energy reserve;
   a plurality of differing energy demand simulators, each including means for selecting the rate of consumption of energy of the corresponding demand;
   an energy pool simulator means responsive to outputs from said energy reserve simulators and said demand simulators for comparing said reserve depletion rates with said demand consumption rates to provide an indication of the balance between the reserve supplies and energy demands; and
   a variable time lapse clock source for simulating accelerated time periods and controlling said selected rates of energy consumption according to the selected accelerated time period.

2. An energy-environment simulator as set forth in claim 1 further including means for indicating the environmental pollution levels accumulated from the simulated production of energy from various ones of said energy reserve simulators.

3. An energy-environment simulator as set forth in claim 2 wherein each of said plurality of energy reserve simulators is an energy-reserve analog computer circuit including a first variable voltage source connected to the input of said reserve analog computer circuit for providing said rate of depletion selection, a first meter connected to read the selected depletion rate voltage, an integrator circuit connected to receive said selected depletion rate voltage and a second meter connected to the output of said integrator for continuously indicating the remaining energy reserve available; and wherein each of said plurality of energy demand simulators includes a second variable voltage source for providing said rate of energy consumption, circuit means connected to said second variable voltage source for providing an output signal indicative of said consumption rate, and a third meter connected to the output of said circuit means for displaying the selected consumption rate.

4. An energy-environment simulator as set forth in claim 3 wherein said plurality of differing energy reserve simulators includes coal, petroleum, natural gas, hydroelectric, nuclear-electric, and geothermal reserves, and wherein said plurality of differing energy demands includes industrial, transportation, and household and commercial demand sections, each of said demand sections including a plurality of separately selectable energy demands.

5. An energy-environment simulator as set forth in claim 4 further including output circuit means connected to said coal, petroleum, and natural gas simulators for selectively proportioning the outputs of said coal, petroleum, and natural gas reserve between a chemical energy output and an electrical energy output, and wherein said energy pool simulator means comprises a chemical energy pool simulator and an electrical energy pool simulator, each including an analog computer circuit having an energy reserve signal input connected to selected outputs of said energy reserve simulators for supplying the corresponding energy, and said energy demand signal input connected to selected outputs of said plurality of energy demand simulators of the corresponding energy demand, a multiplier having a first input connected to receive said energy demand signal, a second input connected to the output of said clock source, and an output for providing a signal which is the product of said first and second inputs thereof representing the energy demand according to the selected accelerated time period, and means for comparing the signals from the output of said multiplier with said energy reserve signal and providing an indication of the balance between the corresponding energy reserve and demand.

6. A computerized energy-environment simulator, comprising:
   a simulator control panel divided into a plurality of major regions, including an energy source region, and energy demand region, an energy pool region, and an environment pollution level indicator region;
   a plurality of manual energy reserve control means located in said energy source region corresponding to a plurality of differing natural energy reserves simulated in said energy source region for separately selecting the rate of depletion of each of said natural energy reserves;
   a plurality of reserve analog computer circuits connected to corresponding ones of said plurality of energy reserve control means and constructed and arranged to produce electrical output signals indicative of the corresponding rates of depletion of said energy reserve selected by said manual energy reserve control means;
   a plurality of manual energy demand control means located in said energy demand region corresponding to a plurality of differing energy demands simulated in said energy demand region for separately selecting the rate of consumption of each of said energy demands;
   a plurality of demand analog computer circuits connected to corresponding ones of said plurality of energy demand control means and constructed and arranged to produce electrical signals at corresponding outputs indicative of the rate of consumption of each of said energy demands selected by said manual energy demand control means;
   indicator means located in said energy pool region for displaying the balance of the energy reserve from said energy reserve region and the total energy demand from said energy demand region;
   a variable time lapse clock source having a selector located on said control panel for generating an electrical clock signal at an output thereof which increases at a rate corresponding to the selected accelerated time period;
   a comparison computer circuit means connected to said indicator means of said energy pool region and constructed and arranged to receive the sum of energy reserve signals from said energy reserve regions at a first input, the sum of said energy demand signals at a second input and said clock signal at a third input for supplying demand signals to said energy pool indicator means corresponding to said selected accelerated time period; and circuit means responsive to selected outputs of said energy reserves for accumulating the environmental pollution level and controlling said pollution level indicator region.

7. An energy-environment simulator as set forth in claim 6 wherein said plurality of differing natural energy reserves simulated in said energy source region includes coal, petroleum, natural gas, hydroelectric, nuclear-electric, and geothermal, and wherein said plurality of differing energy demands of said energy demand region includes industrial, transportation, and household and commercial demand sections, each of said demand sections including a plurality of separately selectable energy demands.

8. An energy-environment simulator as set forth in claim 7 wherein said energy pool region is divided into a chemical energy pool section and an electrical energy pool section and wherein said energy source region further includes means for selectively proportioning the outputs of said coal, petroleum, and natural gas reserves between corresponding inputs of said chemical and electrical pool section inputs.

9. An energy-environment simulator as set forth in claim 8 wherein said comparison computer means of said chemical energy pool section and electrical energy pool section each includes a multiplier circuit having first and second inputs and an output whose signal level is the product of the signal at said first input times the signal at said second input, said first input of said multiplier being connected to receive the sum of the corresponding energy demand signals from respective ones of said separately selectable energy demands of said demand region, and said second input of said multiplier being connected to receive said clock signal so that the output of said multiplier is indicative of the energy demand according to the selected accelerated time period, an indicator connected to the output of said multiplier for continuously indicating the total corresponding energy demand, and a summary amplifier connected to receive said energy source signal and the output of said multiplier, and a meter connected to the output of said amplifier for indicating the balance between the corresponding energy reserve and demand.

10. An energy-environment simulator as set forth in claim 9 wherein said clock source comprises a variable voltage source for controlling said selectable accelerated time period and having a manual control located on said control panel, a first integrator circuit connected to the output of said variable voltage source for providing an analog clock signal, a simulated time indicator connected to the output of said integrator circuit and having a numerical display portion located on said control panel for indicating the elapsed time, a second integrator circuit connected to receive said analog clock signal, a first switching means having a control located on said control panel for selectably applying alternate integrated clock signals at the output of said second integrator corresponding to a linear or exponential demand growth rate, a base voltage source connected at the output of said clock source, and a second switching means connecting the output of said second integrator to said clock output and having a control located on said control panel for selectably applying one of said integrated clock signals to said multiplier circuit according to a selected growing demand rate or disconnecting said second integrator from said multiplier to supply a stable demand signal to said multiplier from said base voltage source.

* * * * *